United States Patent [19]

Pettinger

[11] 4,414,653

[45] Nov. 8, 1983

[54] RODENT CONTROL DEVICE

[76] Inventor: Donald J. Pettinger, 2112 Meadowlane Dr., Chillicothe, Mo. 64601

[21] Appl. No.: 400,912

[22] Filed: Jul. 22, 1982

[51] Int. Cl.³ .............................................. H04B 11/00

[52] U.S. Cl. ...................................................... 367/139

[58] Field of Search ........................... 367/139; 43/124

[56] References Cited

U.S. PATENT DOCUMENTS 4,097,838 6/1978 Fiala .................................... 367/139

4,178,578 12/1979 Hall ..................................... 367/139

4,215,429 7/1980 Riach ................................. 367/139

*Primary Examiner*—Theodore M. Blum

*Attorney, Agent, or Firm*—Kokjer, Kircher, Bradley, Wharton, Bowman & Johnson

[57] ABSTRACT

A device which repels rodents by generating sound waves at a frequency offensive to rats and mice. The sound waves are generated by coils that are alternately energized and deenergized by a solid state control circuit. The circuitry includes two timing circuits which establish a three minute operating cycle during which the coils are energized at the desired 60 cycle per minute frequency for two minutes and are inactive for one minute. The sound waves are transmitted through the ground line of the electrical wiring system of a building, directly through the ground for control of below ground rodents, or through the building itself in the case of a wall mounted unit.

8 Claims, 5 Drawing Figures

10
20
22
24
26
30
32
28
30
28
32

12
14
20
22
24
26
30
32
28
30
32
28

12
16
18
14
18
20
22
24
26
30
32
28
30
28
32

CHASSIS GROUND
BARE 18GA.
LED
P.C. BOARD
110 VAC
+R
-B

RODENT CONTROL DEVICE

BACKGROUND OF THE INVENTION

This invention relates generally to the control of rodents and more particularly to a device which generates sound waves that are offensive to rats and mice.

Sound waves having frequencies of about 60 cycles per minute are known to be offensive to rodents such as rats and mice. Although it has been proposed in the past to utilize sound waves to repel rodents and other pests, the devices that have been proposed for generating sound waves have been unsatisfactory in a number of respects. Perhaps most significantly, the proposed devices require switches, thermostats, flashers, generators, phase energizers, and other complex mechanisms having moving parts that are subject to wear and require frequent inspection, maintanence and replacement. The complexity of the proposed devices also adds appreciably to the manufacturing cost and in most cases makes the cost prohibitive. The sounds generating coils are normally aligned in bucking fashion in order to cause vibrations, and they must be wired to switches such that the device is further complicated.

Typically, the sound waves are swept through a relatively large frequency range in an effort to control a wide variety of flying and crawling pests. However, none of the pests are controlled in an effective manner by this method because the frequency that is offensive to a particular pest is generated for only a small percentage of the time. Thus, the pests return during times when the offensive frequency is absent. Devices that cycle off for significant periods of time such as 5 or 10 minutes have the same problem.

Transmission of the offensive sound waves through the ground has also been proposed in order to control below ground pests. Pipe probes or anchor tubes are required for transmission of the sound waves through the ground, and components of this nature unduly complicate the structure and add to its cost. The pipe probes and anchor tubes are also susceptible to problems which can cause the device to malfunction.

SUMMARY OF THE INVENTION

The present invention provides an improved device for repelling rodents by means of offensive sound waves, and its primary goal is to eliminate the problems that have characterized the prior art devices.

More specifically, it is an important object of the invention to provide a rodent control device that functions to effectively control rodents below ground, above ground, and in virtually all types of buildings. The unit can be constructed in three different forms, one form that is intended for installation in residential or commercial buildings, another form that transmits sound waves through the ground for control of underground pests, and a third form that is intended for installation in industrial or confinement type buildings such as warehouses. In all cases, sound waves are generated at a frequency that is offensive to rodents such as rats and mice. The sound waves are transmitted through the electrical wiring system of the building when the unit is installed in a residential or commercial building, directly to the ground in the case of a ground installed unit, and through both the electrical wiring and the building itself when installed in industrial or confinement buildings.

Another important object of the invention is to provide a rodent control device which is constructed in a simple and economical manner and which lacks moving parts and other complicated components. The device is virtually maintanence free and is devoid of parts that require frequent maintanence or replacement.

A further object of the invention is to provide a rodent control device having an operating cycle during which the offensive sound waves are never absent long enough to permit the return of rodents to the controlled area. The device emits 60 cycle per minute sound waves for two minutes of each three minute operating cycle, and the one minute during which the device is off is insufficient to permit the return of rodents.

An additional object of the invention is to provide a rodent control device of the character described which transmits sound waves directly to the ground without the need for added equipment such as pipe probes, anchor tubes, fence posts and the like.

Yet another object of the invention is to provide, in a rodent control device of the character described, an electronic control circuit that is improved in comparison to the types of circuits that have been proposed in the past. The solid state circuitry employed in the device is maintenance free, highly reliable, and low in power consumption. At the same time, the circuitry accurately maintains the frequency of the sound waves at 60 cycles per minute and controls the on/off cycle of the device such that it is off for only 60 seconds at any one time.

A still further object of the invention is to provide, in a rodent control device of the character described, an attractive yet durable housing which effectively protects the internal components from damage.

Other and further objects of the invention, together with the features of novelty appurtenant thereto, will appear in the course of the following description.

DETAILED DESCRIPTION OF THE INVENTION

In the accompanying drawings which form a part of the specification and are to be read in conjunction therewith and in which like reference numerals are used to indicate like parts in the various views.

Figure 1:
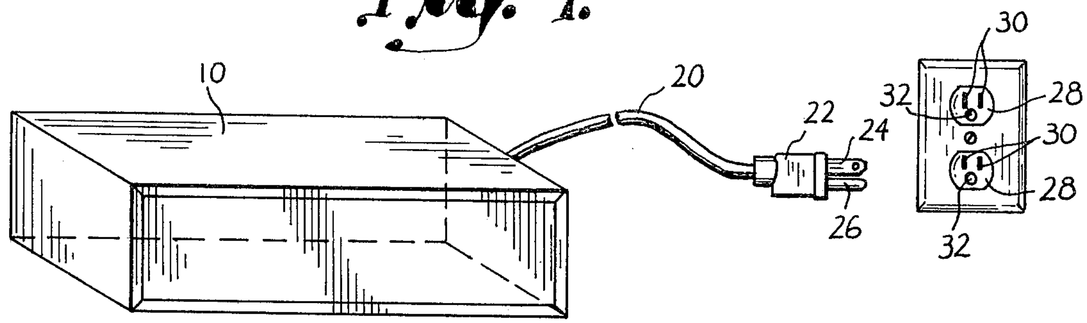
FIG. 1 is a perspective view of the housing for a rodent control device constructed according to one form of the present invention.
Figure 2:
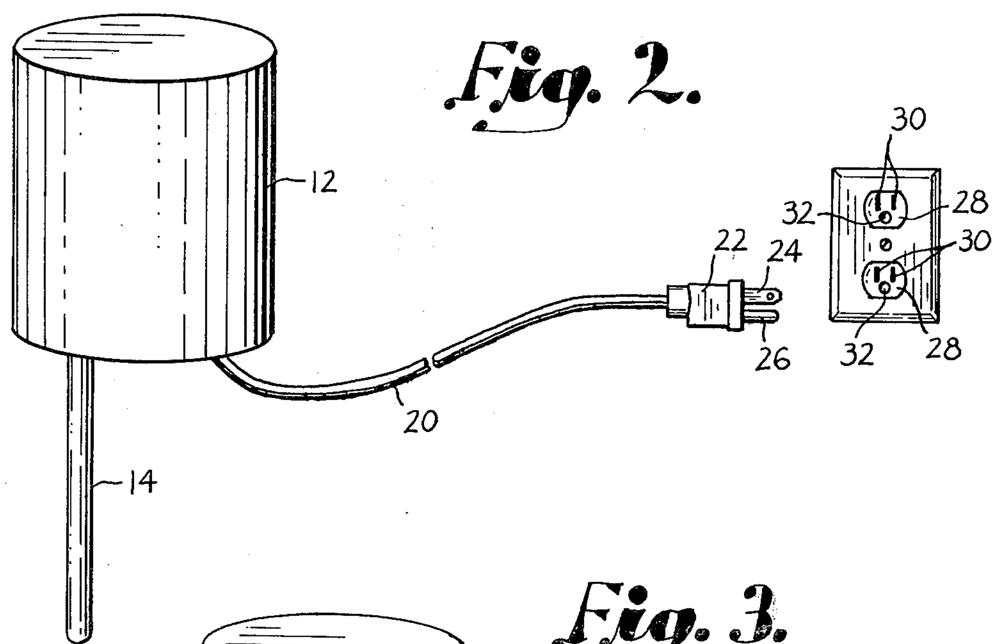
FIG. 2 is a perspective view of the modified housing for a ground installed device.
Figure 3:
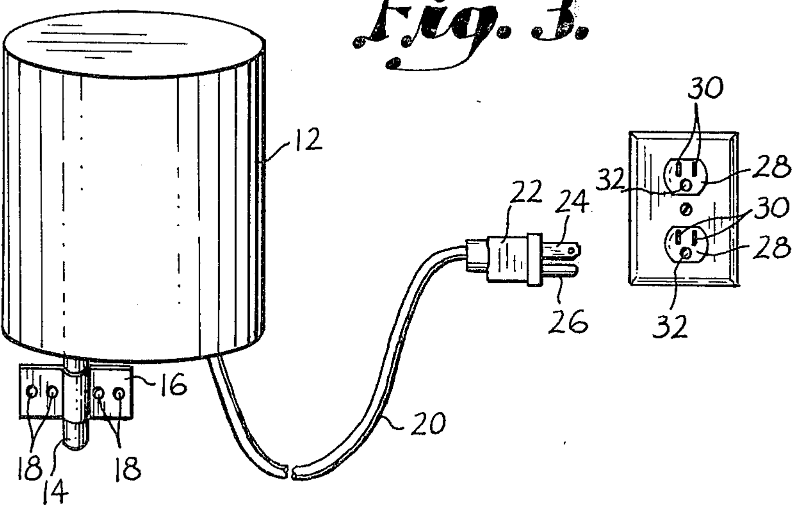
FIG. 3 is a perspective view of still another form of the housing intended for mounting to an industrial or confinement type building.

Referring now to the drawings in more detail and initially to FIGS. 1–3, the present invention provides a rodent control device having a housing that can be constructed in three different forms, depending upon the type of installation desired. FIG. 1 shows a generally rectangular housing 10 which is intended for use when the device is installed in a residential or commercial building. The housing 10 is constructed of interconnected metal panels preferably having a wood grain appearance.

FIG. 2 illustrates a generally cylindrical housing 12 which is intended for use when the device is a ground installed unit. The cylindrical housing 12 is constructed of metal and may also have a wood grain appearance or any other desired appearance. FIG. 3 shows an identical cylindrical housing 12 which is intended for use when the device is to be installed in an industrial or confinement type building such as a warehouse. The device shown in FIG. 3 has an elongate metal bar 14 which projects approximately three inches out through the bottom of the housing and which may be mounted to a metal panel of the building by means of a suitable mounting bracket sixteen. The mounting bracket 16 is provided with a series of holes 18 for the receipt of screws that may be used to secure the mounting bracket to the building panel. The only difference between the devices shown in FIGS. 2 and 3 is that in the device of FIG. 2, the metal bar 14 projects approximately 16 inches from the housing 12 and may be inserted into the ground in order to transmit sound waves directly into the ground, as will be more fully explained.

In all three forms of the invention, an electrical cord 20 extends into the housing and carries a plug 22 on its end. The plug has the usual pair of prongs 24 and a ground prong 26. The plug may be inserted into a receptacle such as a wall outlet 28 having a pair of slots 30 for receiving prongs 24. The ground prong 26 is received in a third opening 32 in the receptacle. The building in which the receptacle 28 is installed includes the usual AC wiring system having hot and neutral lines extending to the slots 30 and a ground line extending to the opening 32. Alternating current at 110 volts is applied to the hot and neutral lines, while the ground line of the building circuit is grounded in the usual fashion.

Figure 4:
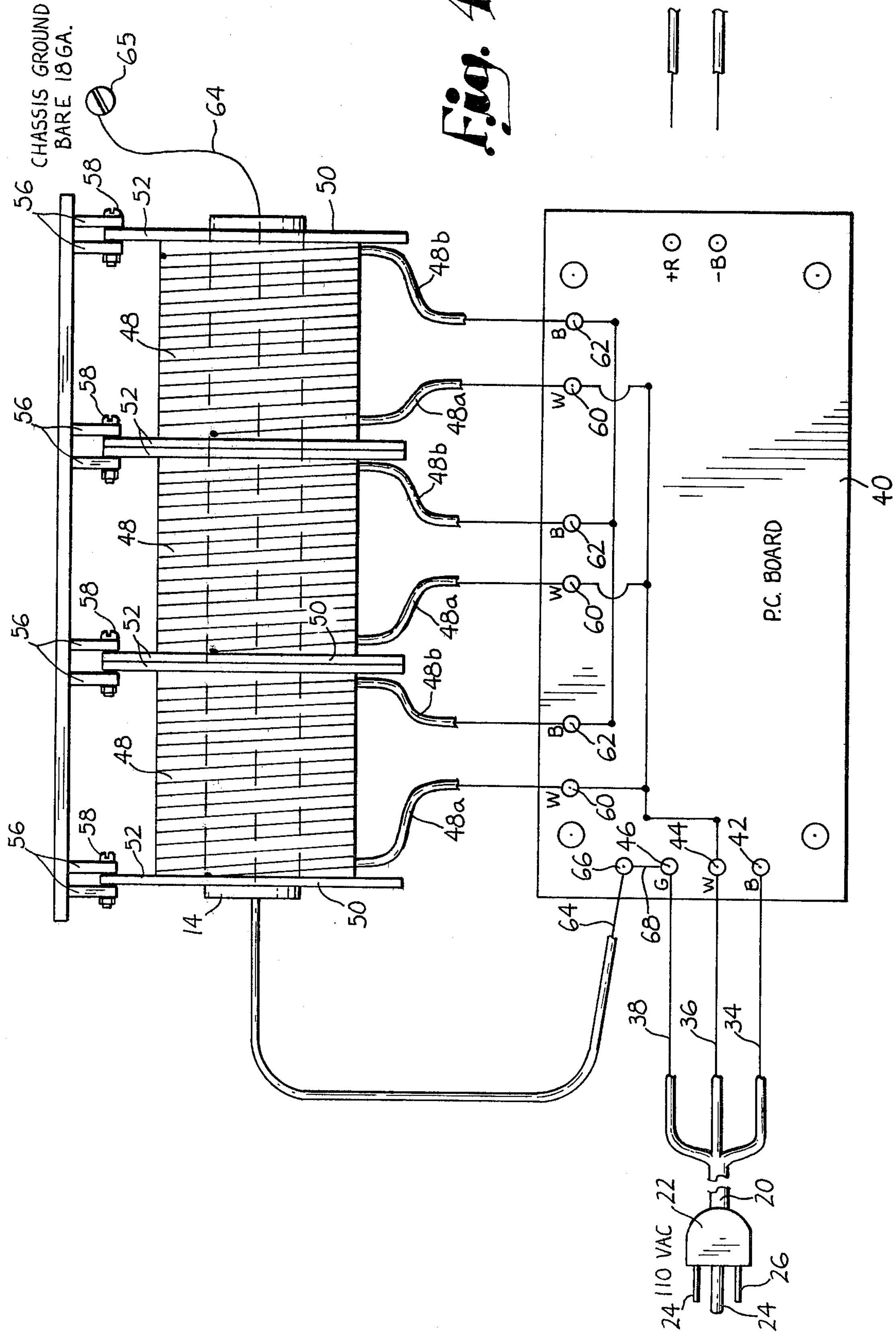
FIG. 4 is a diagrammatic view showing the sound generating coils, printed circuit board and plug included in the device.

Referring now to FIG. 4, the cord 20 extending from plug 22 enters the housing (10 or 12) of the unit and contains insulated conductor wires 34 and 36 and a ground wire 38. The components of an electronic control circuit for the unit are located on a printed circuit board 40 which is suitably mounted within the housing 10 or 12. The PC board 40 has a black terminal 42 to which the hot wire 34 is connected, a white terminal 44 to which the neutral wire 36 is connected, and a ground terminal 46 to which the ground wire 38 is connected. The hot and neutral wires 34 and 36 connect with prongs 24, and the ground wire 36 connects with the ground prong 26 in the usual manner.

With continued reference to FIG. 4, sound waves at a frequency offensive to rodents are generated by three 24 ohm coils 48 which are identical to one another and connected in series. Each coil is in the form of a conductor wire wound on a hollow spool 50. Each spool includes flanges 52 on its opposite ends which are mounted to a bracket 54 suitably secured within the housing of the unit. Projecting from bracket 54 are sets of mounting lugs 56. The spool flanges 52 are received between lugs 56 and are secured thereto by bolts 58.

The steel bar 14 extends through the hollow spools 50 and thus through the centers of coils 48. If the device is to be installed in a residential or commercial building, the bar 14 is wholly contained within the housing as shown in FIG. 1. If the device is to be a ground installed unit, the bar 14 projects approximately sixteen inches below the bottom of the cylindrical housing 12 as shown in FIG. 2. If the device is to be installed in an industrial or confinement type building, the bar 14 projects approximately three inches below the bottom of the cylindrical housing 12, as shown in FIG. 3. The mounting bracket 16 is secured to a metal panel of the building in order to secure the bar 14 thereto.

Each coil 48 has a white lead 48*a* connecting with a white terminal 60 on the PC board 40. The white terminals 60 are connected with one another and with terminal 44. Each of the coils also has a black lead 48*b* which connects with a block terminal 62 on the PC board. Terminals 62 are connected with one another as shown in FIG. 4.

Embedded in and extending through the steel bar 14 is a ground wire 64. One end of the ground wire is grounded to the chassis or housing of the device, as by means of a screw 65 (FIG. 4). The opposite end of the ground wire 64 connects with a terminal 66 on the PC board. Terminal 66 is connected with terminal 46 as indicated at 68. The ground wire 64 is thus connected with ground wire 38 and with the ground prong 26 of plug 22.

Figure 5:
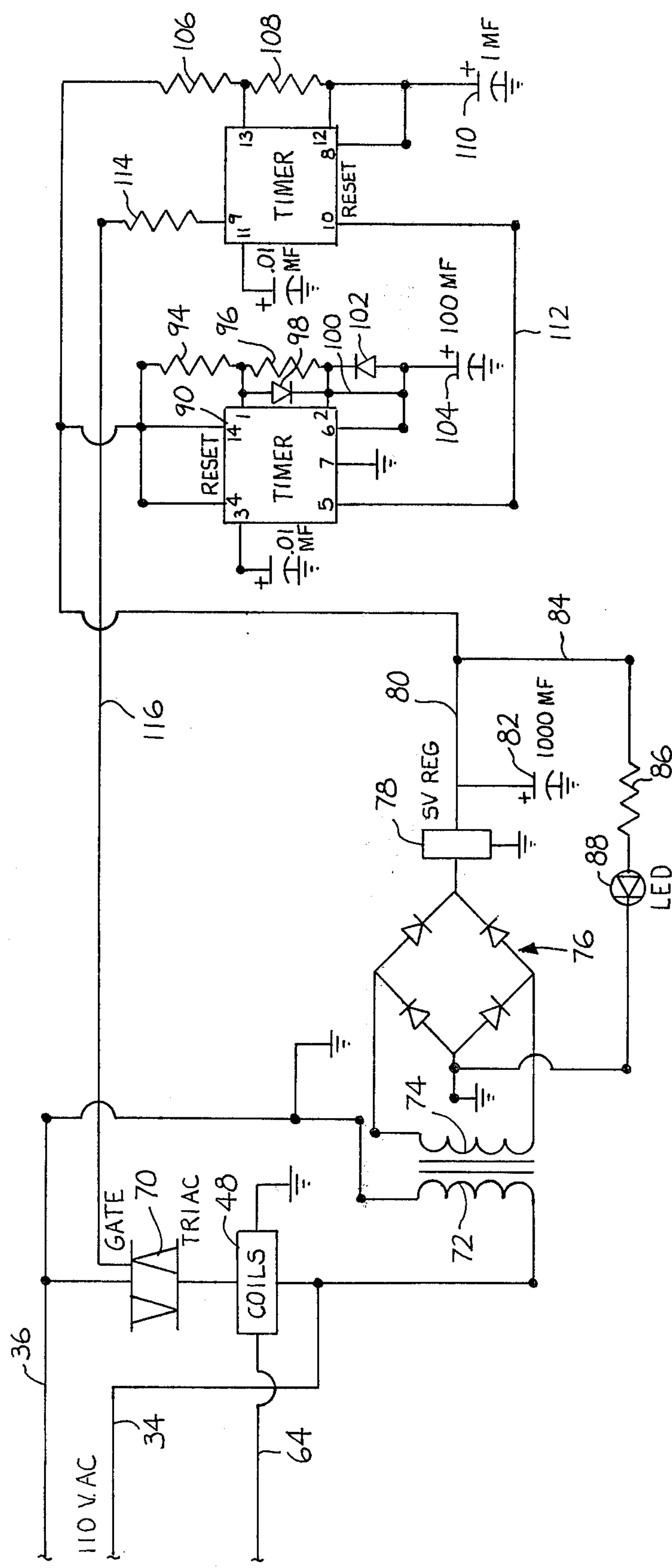
FIG. 5 is a schematic circuit diagram of the control circuit for the device.

FIG. 5 illustrates schematically the solid state circuit that controls the operation of the rodent control device. A triac switching device 70 is connected in series with the coils 48 between the hot and neutral lines 34 and 36. Thus, current is applied to the coils only when the triac 70 is conductive. A 6.3 volt transformer steps the 110 volt AC power down to 6.3 volts. The primary side 72 of the transformer is connected between the conductors 34 and 36 in parallel with the coils and triac, while the secondary side 74 of the transformer provides the input to a bridge rectifier 76 formed by four diodes arranged in a bridge circuit configuration. The DC output from the bridge rectifier is applied to a voltage regulator 78 which further refines the voltage appearing on line 80, which is the output line from the voltage regulator. Filtering is provided by a 1000 microfarad capacitor 82. Connected with line 80 is a conductor 84 having a resistor 86 and an LED 88 therein. Line 84 is also connected with the bridge circuit and with ground.

The signal appearing on line 80 is fed to an NE556 integrated circuit which operates as a dual timer. One of the timers 90 controls the on/off cycle of the rodent control device, and the other timer 92 controls the gate terminal of the triac 70.

Line 80 connects with pins 4 and 14 of timer 90 and with pin 1 through a resistor 94. Pin 4 is the reset pin of circuit 90. Connected in parallel between the inputs to pins 1 and 2 of circuit 90 are another resistor 96 and a diode 98. The inputs to pins 2 and 6 of circuit 90 are connected by line 100 and by a diode 102 which is arranged in parallel with line 100. Pin 6 is also connected with ground through a 100 microfarad capacitor 104. It is noted that the capacitor 104 is charged through resistor 94 and diode 98 and is discharged through diode 102 and both resistors 96 and 94.

Line 80 is connected with pin 13 of timer 92 through a resistor 106 and with pin 102 through an additional resistor 108. Connected with pins 8 and 12 is a one microfarad capacitor 110 having a ground connection. The output signal from timer 90 is applied on pin 5 which is connected by line 112 with the reset pin 10 of timer 92. The output signal from timer 92 is applied through a resistor 114 and to the gate terminal of triac 70 via line 116.

In operation, the rodent control device generates sound waves at a frequency of 60 cycles per minute. Sound waves at this frequency are offensive to rats and mice and repel the rodents from the area that is being controlled. In the embodiment of the invention shown in FIG. 1, the sound waves are transmitted via the ground wire through the wiring system of the building. In the embodiment shown in FIG. 2, the metal bar 14 is embedded in the ground, and the sound waves are transmitted from the metal bar directly into and through the ground to repel below ground rodents. In the embodiment shown in FIG. 3, the sound waves are transmitted through the wiring system of the building and also directly to the building itself through the steel bar 14 which is mounted to a metal panel or other part of the building.

In all cases, the device is activated by inserting the plug 22 into a receptacle such as the wall outlet 28. Prongs 24 fit in slots 30 and the ground prong 26 fits into opening 32 in the usual manner.

Referring now to FIG. 5 in particular, lines 34 and 36 provide a completed circuit through the primary side 72 of the 6.3 volt transformer when the device is plugged into the wall outlet. The coils 48 are energized only when the triac 70 is conductive. The secondary side 74 of the transformer provides alternating current at 6.3 volts, and the alternating current is converted into direct current by the bridge rectifier 76. The direct current is further refined by the 5 volt regulator 78 and is filtered by the capacitor 82.

The 5 volt DC filtered signal that appears on line 80 is applied to the timers 90 and 92 of the dual timer integrated circuit. The capacitor 104 associated with timer 90 is charged through resistor 94 and diode 98. Once capacitor 104 is fully charged, an input signal appears on pin 6 of timer 90, and the timer then provides an output signal on line 112. This signal is applied to the reset pin 10 of timer 92. At this time, capacitor 110 has been fully charged through resistors 106 and 108, and timer 92 thus provides an output signal through resistor 114 on line 116. The signal on line 116 is applied to the gate terminal of the triac 70, and the triac is then conductive such that the coils 48 are energized.

Capacitor 110 is charged and discharged through resistors 106 and 108. In a preferred form of the invention, the values of the various components are properly selected such that compacitor 110 is charged and discharged once per second. Accordingly, the input applied to pin 8 cycles once per second, and the output signal on line 116 cycles once per second. Consequently, the triac 70 is cycled once per second, and the coils 48 are energized and deenergized at a frequency of 60 cycles per minute.

The sound waves at 60 cycles per minute that are generated by the coils 48 are transmitted to the ground wire 64 and through line 38 and ground prong 26 to the ground line of the AC wiring system of the building. The sound waves are thus transmitted through the wiring system of the building on its ground line, and the 60 cycle per minute frequency of the sound waves repels mice, rats, and other rodents.

Since the ground line 64 is embedded in bar 14, the sound waves are also transmitted to the bar. Thus, when the bar 14 of the FIG. 2 embodiment is embedded in the ground, the sound waves are transmitted directly to the ground from bar 14 and through the ground to repel below ground rodents. It is pointed out that there is no need for pipe probes, anchor tubes or other added components for transmission of the sound waves to the ground. In case of the FIG. 3 embodiment, the sound waves are transmitted through the ground wire of the building wiring system and also directly to the building through the bar 14 which is mounted directly to the building by means of the mounting bracket 16.

Timer 90 controls the on/off cycle of the rodent control device. It is noted that capacitor 104 is charged through resistor 94 and diode 98 and is discharged through diode 102 and resistors 94 and 96. In a preferred form of the invention, the values for the various circuit components are selected such that capacitor 104 is charged in one minute and discharged in two minutes. By this arrangement, a high signal appears at pin 6 of timer 90 for two minutes out of every three minutes, and a signal is applied on line 112 for two minutes out of every three minutes. A three minute operating cycle of the device is thus established, and timer 92 is maintained in an active state and is capable of producing pulses on line 116 for two minutes out of every three minute operating cycle. During each operating cycle, the triac 70 is cycled at 60 cycles per minute for two minutes and is non conductive for the other minute. The one minute period during each operating cycle when coils 48 are deenergized continuously does not provide the rodents with sufficient time in which to return to the control area.

The triac 70 serves as a switching device which alternately energizes and deenergizes the coils 48 depending upon whether the triac is in a conductive or non-conductive state which in turn depends upon whether or not a high signal is present on line 116. Timer 92 controls the frequency of the signal applied to line 116 (one cycle per second), and the other timer 90 controls the on/off cycle of the device and assures that it is active for two minutes out of each three minute operating cycle.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since may possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. Apparatus for repelling rodents from a building having an AC wiring system including hot and neutral lines and a ground line all connected with a receptacle, said apparatus comprising:

a housing;

at least one coil in said housing operable to generate sound waves offensive to rodents when alternately energized and deenergized at a predetermined frequency;

a plug adapted to be received by the receptacle, said plug having a pair of prongs establishing electrical connection with the hot and neutral lines and a ground prong establishing electrical connection with the ground line when the plug is received by the receptacle;

means providing an electric circuit extending between said pair of prongs, said circuit including said coil therein to effect energization of the coil when said plug is received by the receptacle and said circuit is completed;

frequency control means for alternately completing and interrupting said circuit at said predetermined frequency; and a ground wire extending through said coil to transmit the sound waves generated by the coil, said ground wire having one end connected to the housing and an opposite end connected to said ground prong of the plug to transmit the sound waves through the ground prong to the ground line of the wiring system of the building.

2. Apparatus as set forth in claim 1, including a bar member extending through said coil within the housing, said ground line extending within said bar member.

3. Apparatus as set forth in claim 1, including a bar member extending through said coil to receive the sound waves generated thereby, said bar member projecting out of said housing and being adapted for insertion into the soil to transmit the sound waves directly from the bar member to the soil.

4. Apparatus as set forth in claim 1, including:

a bar member extending through said coil to receive the sound waves generated thereby, said bar member projecting out of said housing; and a mounting bracket adapted to mount said bar member to the building to transmit the sound waves directly from the bar member to the building.

5. Apparatus as set forth in claim 1, wherein said frequency control means includes:

switch means in said circuit operable to complete the circuit in a first condition of the switch means and to interrupt the circuit in a second condition of the switch means;

a timing circuit providing a cycling output signal at said predetermined frequency when activated;

means for activating said timing circuit when said plug is inserted into the receptacle; and means for applying said cycling output signal to said switch means to alternately effect said first and second conditions thereof at said predetermined frequency, thereby alternately completing and interrupting said circuit at said predetermined frequency to generate sound waves offensive to rodents.

6. Apparatus as set forth in claim 5, including:

a second timing circuit having an established cycle of operation with an established duration, said second timing circuit being operable when said plug is received in the receptacle to provide a control signal for a preselected time during each cycle and to remove the control signal for the remainder of each cycle; and means for applying said control signal to the first mentioned timing circuit to effect activation of the first timing circuit when the control signal is present and deactivation of the first timing circuit when the control signal is absent, whereby the first timing circuit is activated for only said preselected time during each cycle of the second timing circuit.

7. Apparatus as set forth in claim 6, wherein said remainder of each cycle is no longer than about one minute, whereby the first timing circuit is continuously inactivated for no longer than about one minute.

8. Apparatus as set forth in claim 6, wherein:

each cycle of operation has a duration of about three minutes; and said preselected time during each cycle is about two minutes, whereby said remainder of each cycle is about one minute long.

* * * * *